(12) United States Patent
Jonovic et al.

(10) Patent No.: US 10,065,278 B2
(45) Date of Patent: Sep. 4, 2018

(54) SPILL RESISTANT WARMING DRAWER

(71) Applicant: Western Industries, Inc., Watertown, WI (US)

(72) Inventors: Scott A. Jonovic, Cottage Grove, WI (US); William H. Punzel, Edgerton, WI (US); Robert E. Fredrick, Watertown, WI (US)

(73) Assignee: Western Industries Incorporated, Watertown, WI (US)

( * ) Notice: Subject to any disclaimer, the term of this patent is extended or adjusted under 35 U.S.C. 154(b) by 768 days.

(21) Appl. No.: 14/159,989

(22) Filed: Jan. 21, 2014

(65) Prior Publication Data

US 2014/0202341 A1 Jul. 24, 2014

Related U.S. Application Data

(60) Provisional application No. 61/755,144, filed on Jan. 22, 2013.

(51) Int. Cl.

| H05B 1/02 | (2006.01) |
|---|---|
| F24C 15/00 | (2006.01) |
| A47J 39/00 | (2006.01) |
| B23P 19/00 | (2006.01) |
| A47J 36/24 | (2006.01) |

(52) U.S. Cl.
CPC .......... *B23P 19/00* (2013.01); *A47J 36/2483* (2013.01); *Y10T 29/49826* (2015.01); *Y10T 29/49982* (2015.01)

(58) Field of Classification Search
CPC ........ F24C 15/18; F24C 7/087; A47J 36/2483

USPC ................................ 219/385, 391, 400, 494
See application file for complete search history.

(56) References Cited

U.S. PATENT DOCUMENTS

| 2,573,772 A | 11/1951 | Nysten |
| 2,897,812 A | 8/1959 | Albrecht |
| 3,733,836 A | 5/1973 | Corini |
| 3,958,552 A | 5/1976 | Lawler |
| 3,978,238 A | 8/1976 | Frey et al. |
| 4,039,776 A | 8/1977 | Roderick |
| 4,237,623 A | 12/1980 | Timm et al. |
| 4,309,584 A | 1/1982 | Terakami |
| 4,344,358 A | 8/1982 | Maurer |
| 4,345,143 A | 8/1982 | Craig et al. |
| 4,345,145 A | 8/1982 | Norwood |
| 4,439,459 A | 3/1984 | Swartley |
| 4,444,175 A | 4/1984 | Reynolds |
| 4,446,780 A | 5/1984 | Puvogel et al. |

(Continued)

FOREIGN PATENT DOCUMENTS

| JP | 8259286 | 10/1996 | |
| WO | WO 2011056742 A1 * | 5/2011 | ............. C03C 15/00 |

*Primary Examiner* — Dana Ross
*Assistant Examiner* — Lawrence Samuels
(74) *Attorney, Agent, or Firm* — Boyle Fredrickson, S.C.

(57) ABSTRACT

A spill-resistant appliance may be constructed to prevent spilled liquids from entering a control housing and contacting electronics with the use of a first sealant preferably formed out of santoprene and a second sealant preferably formed out of a very high bond, double-sided foam tape. The first sealant and the second sealant may be used in various areas of the control housing that contains electronics for operating the appliance. The first and second sealants may also be used to help attach the control housing to other components of the appliance.

16 Claims, 13 Drawing Sheets

(56) References Cited

U.S. PATENT DOCUMENTS

| | | |
|---|---|---|
| 4,468,424 A | 8/1984 | Cartwright |
| 4,471,537 A | 9/1984 | Meda |
| 4,503,760 A | 3/1985 | Pryputsch et al. |
| 4,622,231 A | 11/1986 | Swartley |
| 4,644,136 A | 2/1987 | Watchman |
| 4,682,424 A | 7/1987 | Irving |
| 4,751,368 A | 6/1988 | Daifotes |
| 4,849,610 A | 7/1989 | Alvarez |
| 4,927,995 A | 5/1990 | Lovett et al. |
| 4,980,539 A | 12/1990 | Walton |
| 5,086,752 A | 2/1992 | Hait |
| 5,233,969 A | 8/1993 | Koledin |
| 5,360,965 A | 11/1994 | Ishii et al. |
| 5,365,039 A | 11/1994 | Chaudoir |
| 5,369,892 A | 12/1994 | Dhaemers |
| 5,417,148 A | 5/1995 | Cavallo |
| 5,466,058 A | 11/1995 | Chan |
| 5,546,678 A | 8/1996 | Dhaemers |
| 5,555,640 A | 9/1996 | Ou |
| 5,569,403 A | 10/1996 | Swanson et al. |
| 5,599,471 A | 2/1997 | Zaidman |
| 5,676,051 A | 10/1997 | Sinemus |
| 5,718,165 A | 2/1998 | Winstead |
| 5,726,424 A | 3/1998 | Koether |
| 5,783,803 A | 7/1998 | Robards, Jr. |
| 5,842,287 A | 12/1998 | Murphy |
| 5,873,300 A | 2/1999 | Kuhlman |
| 5,900,173 A | 5/1999 | Robards, Jr. |
| 5,948,301 A | 9/1999 | Liebermann |
| 5,961,866 A | 10/1999 | Hansen |
| 5,981,927 A | 11/1999 | Osepchuk et al. |
| 6,005,227 A | 12/1999 | Pappas |
| 6,035,770 A | 3/2000 | Whitefield |
| 6,041,773 A | 3/2000 | Rosenquist |
| 6,046,436 A | 4/2000 | Hunts |
| 6,108,489 A | 8/2000 | Frohlich et al. |
| 6,111,224 A | 8/2000 | Witt |
| 6,124,572 A | 9/2000 | Spilger et al. |
| 6,153,837 A * | 11/2000 | Garcia .................. F24C 7/083 200/18 |
| 6,166,353 A | 12/2000 | Senneville et al. |
| 6,191,391 B1 | 2/2001 | Deo et al. |
| 6,310,332 B1 | 10/2001 | Gerrard |
| 6,370,882 B1 | 4/2002 | Adamski et al. |
| 6,414,283 B1 | 7/2002 | McNamara |
| 6,437,291 B1 | 8/2002 | Hopponen |
| 6,484,512 B1 | 11/2002 | Anderson et al. |
| 6,523,458 B1 | 2/2003 | Turner |
| 6,525,298 B1 | 2/2003 | Hunts |
| 6,573,483 B1 * | 6/2003 | DeCobert ................ A47J 27/62 219/432 |
| 6,612,116 B2 | 9/2003 | Fu et al. |
| 6,649,835 B2 | 11/2003 | Gilleran |
| 6,657,167 B2 | 12/2003 | Loveless |
| 6,660,974 B2 | 12/2003 | Faries, Jr. et al. |
| 6,693,260 B1 | 2/2004 | Rodrigues |
| 6,713,733 B2 | 3/2004 | Kochman et al. |
| 6,730,888 B1 | 5/2004 | Battu |
| 6,774,343 B2 | 8/2004 | Ibanez |
| 6,832,732 B2 | 12/2004 | Burkett et al. |
| 6,840,589 B2 | 1/2005 | Uri |
| 6,849,835 B2 * | 2/2005 | Bollmers ................ F24C 15/18 219/400 |
| 7,078,873 B2 | 7/2006 | Suzuki et al. |
| 7,087,873 B2 | 8/2006 | Hayakawa et al. |
| RE39,365 E | 10/2006 | Zaydman |
| 7,166,821 B2 | 1/2007 | Adamski |
| 7,189,945 B2 | 3/2007 | Starr et al. |
| 7,208,700 B2 | 4/2007 | Peterson et al. |
| 7,235,762 B2 | 6/2007 | Gagas et al. |
| 7,279,659 B2 * | 10/2007 | Gagas .................... F24C 15/18 219/385 |
| 7,488,919 B2 * | 2/2009 | Gagas .................... F24C 7/087 219/400 |
| 8,058,588 B2 | 11/2011 | Gagas et al. |
| 8,481,895 B2 | 7/2013 | Taylor et al. |
| 8,916,802 B2 * | 12/2014 | Bringe .................... A21B 1/22 219/385 |
| 9,062,916 B2 * | 6/2015 | Bringe .................... F27D 1/00 |
| 9,347,671 B2 * | 5/2016 | Bringe .................... F24C 7/00 |
| 2002/0117497 A1 * | 8/2002 | Bassill .................. H05B 6/062 219/626 |
| 2004/0026946 A1 | 2/2004 | Reed et al. |
| 2004/0070574 A1 * | 4/2004 | Wylie .................... F24C 7/082 345/184 |
| 2005/0211696 A1 * | 9/2005 | Adamski ................. A47J 39/00 219/400 |
| 2005/0274712 A1 * | 12/2005 | Gagas .................... F24C 15/18 219/494 |
| 2006/0043087 A1 * | 3/2006 | Gagas .................... F24C 15/18 219/391 |
| 2006/0138118 A1 | 6/2006 | Chan |
| 2006/0278629 A1 * | 12/2006 | Gagas ................ A47J 36/2483 219/385 |
| 2007/0114221 A1 | 5/2007 | Shon et al. |
| 2007/0158327 A1 * | 7/2007 | Morrow ................ A47J 27/004 219/385 |
| 2007/0158331 A1 * | 7/2007 | Morrow ............. A47J 36/2483 219/412 |
| 2008/0041232 A1 * | 2/2008 | Fai ...................... A47J 31/3685 99/279 |
| 2008/0173631 A1 * | 7/2008 | Gagas ................ A47J 36/2483 219/400 |
| 2009/0078127 A1 | 3/2009 | McLemore et al. |
| 2009/0140622 A1 * | 6/2009 | Suetsugu ................ F24C 7/087 312/330.1 |
| 2009/0200901 A1 * | 8/2009 | Suetsugu ................ F24C 15/18 312/236 |
| 2009/0320882 A1 | 12/2009 | Atwater |
| 2010/0102693 A1 * | 4/2010 | Driver .................. A47B 95/043 312/408 |
| 2010/0133263 A1 * | 6/2010 | Toyoda ................ H05B 6/6411 219/681 |
| 2010/0145483 A1 * | 6/2010 | McGonagle ............ F24C 7/082 700/83 |
| 2012/0074121 A1 * | 3/2012 | Gagas ................ A47J 36/2483 219/385 |
| 2012/0216880 A1 * | 8/2012 | Nall ........................ C03C 15/00 137/312 |
| 2013/0319397 A1 * | 12/2013 | Braden .................... F24C 15/04 126/200 |
| 2013/0319994 A1 * | 12/2013 | Bringe .................... A21B 1/22 219/391 |
| 2013/0319995 A1 * | 12/2013 | Bringe .................... F24C 7/00 219/399 |
| 2013/0323663 A1 * | 12/2013 | Harward ................ A47J 39/02 432/247 |

* cited by examiner

SPILL RESISTANT WARMING DRAWER

CROSS-REFERENCE TO RELATED APPLICATION

This application claims priority from U.S. Provisional Patent Application Ser. No. 61/755,144, filed on Jan. 22, 2013, the entirety of which is expressly incorporated by reference herein.

BACKGROUND OF THE INVENTION

1. Field of the Invention

Spill protection is often sought for appliances used in both the kitchen and outdoors. This invention relates to preventing liquids from entering the internals of such appliances.

2. Discussion of the Related Art

Warming drawers are well known in the prior art. U.S. Patent No. D608,144 discloses a warming drawer wherein the controls are exposed on the drawer front. During use, it is possible for liquid spills above the drawer to drip onto the controls and potentially interfere with proper operation.

Another example of a warming drawer is disclosed in U.S. Pat. No. 6,849,835. As shown in FIG. 1, control knobs are exposed on an outer surface of the housing. Just as described above, water spills during use of the warming drawer may introduce moisture to the control area and potentially seep into the electronics within the appliance.

What is needed, therefore, is a way to spill-proof appliances, such as warming drawers, making them resistant to entry of liquids such as water. What is also needed is to prevent liquids from seeping past controls and reaching delicate electronics within the appliance. Furthermore, it is also needed to prevent intrusion of liquids into appliances through any openings such as control housing seams, knob openings, indicator lights, and power switches, thus ensuring proper operation.

SUMMARY AND OBJECTS OF THE INVENTION

A spill-resistant appliance is hereby disclosed comprising a chassis. The chassis forms a box with a front portion. A plurality of openings is included on the front portion and may hold various components such as control knobs, switches, lights, and other similar items. The chassis includes sides and a cavity configured to receive an extendable member that may extend from and retract into the cavity.

A control housing holds a plurality of controls which may include circuit boards, wiring, and other electronic devices. The control housing attaches to the front portion and sides of the chassis with removable fasteners. Either manual or electronic controls may be inserted into the plurality of openings on the front portion of the chassis and communicate via wired communication or even wirelessly with the plurality of controls in the control housing.

in order to protect the controls within the control housing from liquid such as water spills, a first sealant may be included on each of the openings on the front portion of the chassis. The first sealant may include o-rings, rings, or flexible boots made from any material such as rubber or poly vinyl chloride. The first sealant forms a liquid-tight seal between the plurality of manual controls and the front portion of the chassis for preventing liquid from entering the control housing through the plurality of openings.

A second sealant may also be included between the control housing and the parts of the chassis in contact with the control housing such as the front portion and sides. The second sealant may include a gasket material such as thermoplastic vulcanizate (TPV) (for example, SANTOPRENE™, silicone, paper, poly vinyl chloride, adhesive bonding tape, or any other gasket, and forms a liquid-tight seal on any seam created during manufacturing of the control housing and between the control housing and the chassis. Preferably, when adhesive bonding tape is used, very high bond "VHB" tape may be used such as VHB double-sided foam tape produced by 3M. An added benefit to VHB tape is it that it works as both a sealant and for securing parts together.

The first sealant may include at least one control knob shaped to interlock with a ring in an opening on the front portion of the chassis. The ring mates with both the opening and the knob to form a liquid-tight seal, preventing liquid from entering the opening. The ring may be made of any material but is preferably a rubber or poly vinyl chloride material. The knob and the ring preferably move relative to one another with the ring statically fixed on the front portion of the appliance. Alternatively, the ring may be attached to the knob and moves with the knob as it is turned.

Inside the control housing, the plurality of controls is stored and controls all the functions of the appliance. The controls inside the control housing may include electronic circuit boards, wiring, or any other electronic devices. Additionally, the controls may include at least one indicator light and the first sealant may also include an o-ring, or gasket, secured on the indicator light. In order to properly locate and supply sufficient force to hold the o-ring in place, a clip may be provided that attaches to the indicator light and presses the o-ring against the front portion of the chassis or the control housing, preventing liquid from entering the respective opening.

The plurality of manual controls may also include a switch with a flexible boot between the switch and the front portion of the chassis forming a liquid-tight seal and preventing water from entering the respective opening.

In the event that any liquid should enter the any openings on the front portion of the chassis, the second sealant may also include an adhesive bonding tape, sealant strips, gasket strips, or gasket forms that attach to the front portion of the chassis at an inclined angle to deflect liquids away from the control housing.

When manufacturing the control housing, a box-like shape may be preferential. When making the edges of the box, seams may be used that include openings into the interior of the box. Flaps or flanges made with right angles may be used to cover the respective seams and prevent liquid from entering the control housing. Additionally, the first or second sealant may he used to further prevent water from entering the control housing at the seams.

After the appliance is constructed, or ever partially constructed, the effectiveness of the first and second sealants, and any other liquid-proofing elements, may be tested. The testing may include pouring a significant amount of liquid, for example, at least 500 milliliters of a tap water or a water spray, on the control housing and determining the effectiveness of preventing the tap water from entering the control housing with the use of the first and second sealant and also the right angle flanges.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention and of the construction and operation of typical mechanisms provided with the present invention will become more readily apparent by referring to the exemplary, and therefore non-limiting, embodiments illustrated in the drawings accompanying and forming a part of this specification, wherein like reference numerals designate the same elements in the several views, and in which.

Figure 1:
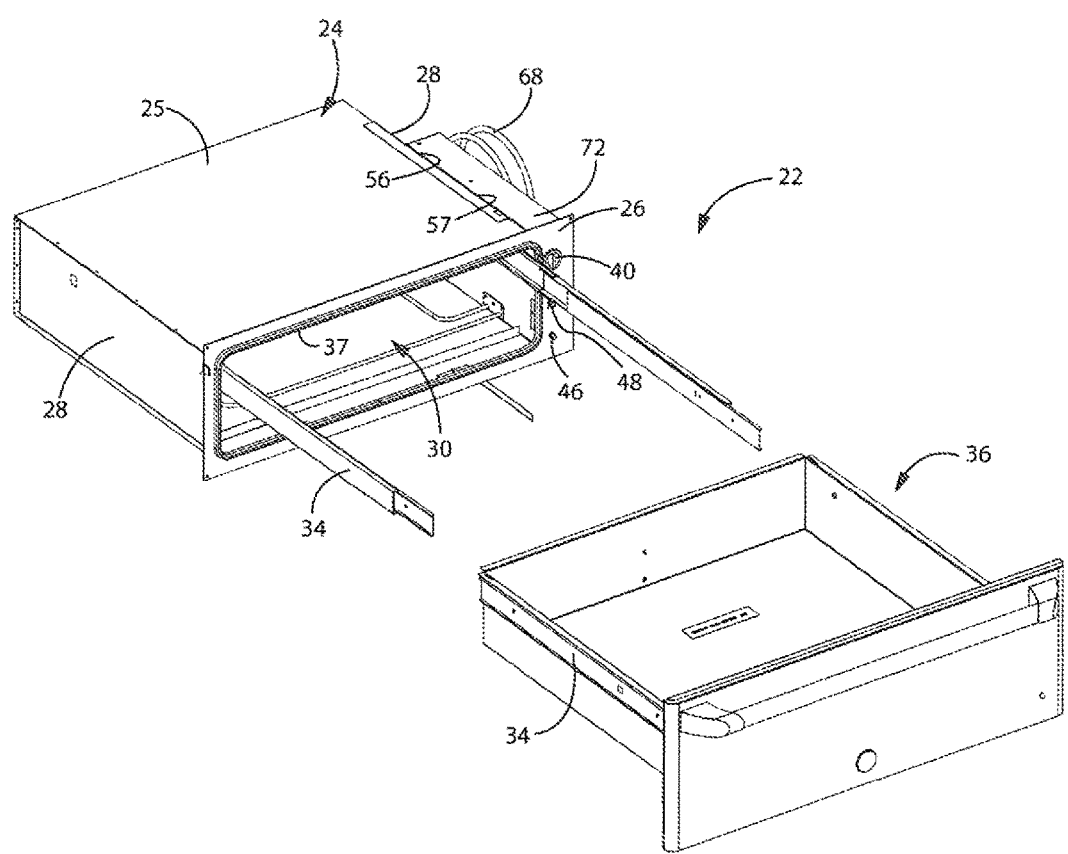
FIG. 1 illustrates a partially exploded perspective view of a spill-resistant appliance according to one embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION OF EMBODIMENTS

The present invention and the various features and advantageous details thereof are explained more fully with reference to the nonlimiting embodiments described in detail in the following description.

Beginning with FIG. 1, an appliance 22 is shown in a partially exploded, perspective view. The appliance 22 includes a chassis 24 and a drawer 36. The drawer 36 may be inserted into the chassis 24 and extended from the chassis 24 by gliding along a pair of rails 34. The chassis 24 is preferably formed in the shape of a box 25 with sides 28 and a front portion 26. A cavity 30 forms the interior of the box 25 and receives the drawer 36. A gasket 37 may be used to seal the cavity 30 when the drawer 36 is in the retracted position and inside the cavity.

In order to control the function of the appliance 22, a plurality of manual controls is included on the front portion 26 of the chassis 24. The manual controls may include a touch screen LCD, pushbuttons, capacitive touch buttons, or any other manual input devices. The manual controls may also include electronic controls. Preferably, the controls include a knob 40, a switch 48, and an indicator light 46. The knob 40 is preferably configured to allow rotary adjustment to modify the operation of the appliance 22. The switch 48 is preferably a rocker switch for turning the appliance 22 on and off. The indicator light 46 may indicate whether the appliance 22 is on or off or may signal malfunctions as well.

Various electronic components that communicate with the knob 40, switch 48, and indicator light 46 may be included in a control housing 72 that is attached to the chassis 24 along one of the sides 28 and the front portion 26 of the box 25. A power cord 68 may also extend from the interior of the control housing 22 to the exterior of the control housing 22.

In order to prevent liquid spills that may occur in the vicinity of the appliance 22 from damaging the controls, various sealants may be used to protect the contents inside the control housing 72. For example, a first sealant 56 may be included along the joint where the control housing 72 meets the box 25. The first sealant 56 may be any type of sealant that may be formed into a gasket-like material. Gasket-like materials include paper, cork, silicone, fibrous material, neoprene, but, preferably, TPV, such as SANTO-PRENE™, is used. The first sealant 56 may be cut into various shapes to form premade gaskets that are attached at various points of the chassis 24. Any potential spots where liquid may enter the control housing may be sealed with the first sealant 56 to form a watertight. leak-proof joint 57. The first sealant 56 is particularly advantageous to seal the joints where two objects are joined together. The joint 57 between the control housing 22 and the box 25, for example, benefit from the use of the first sealant along the joint 57 and helps keep liquids out of the control housing 72.

Figure 2:
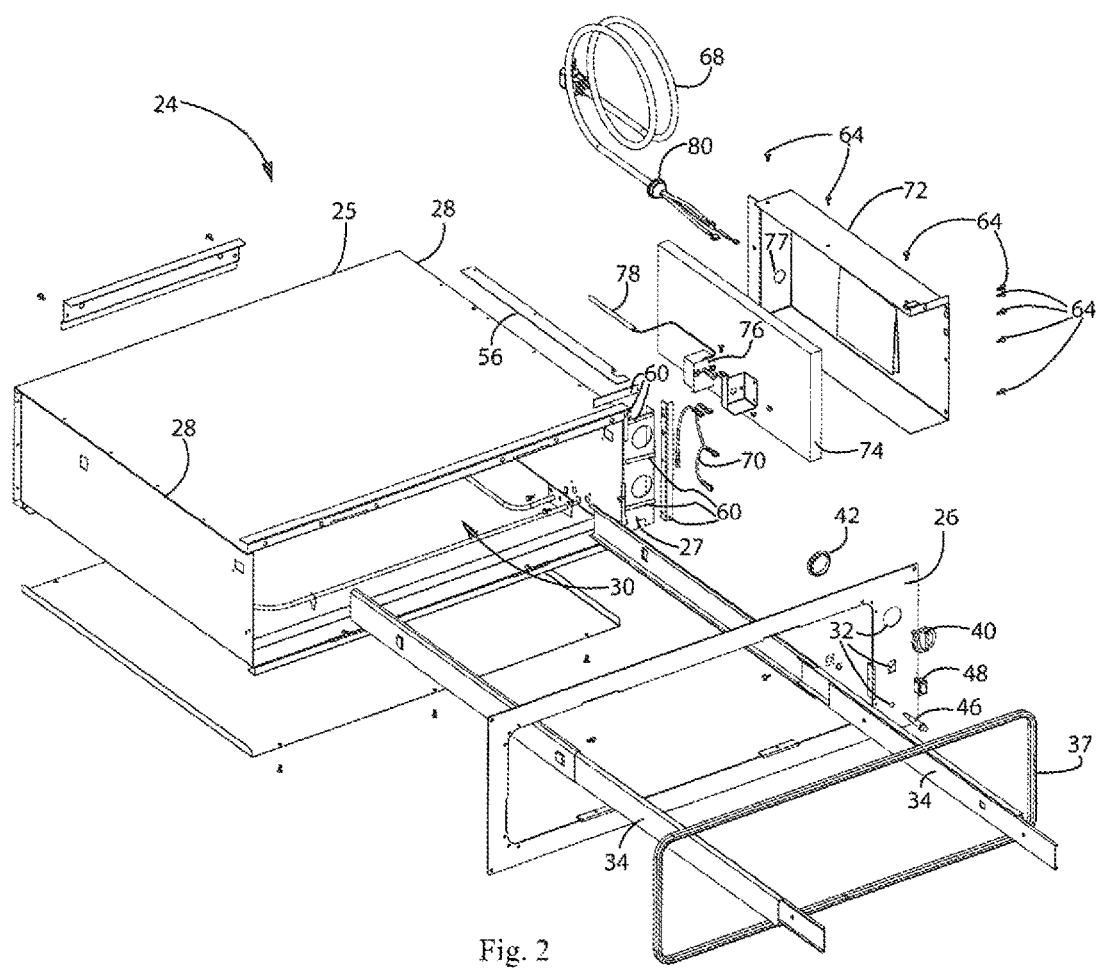
FIG. 2 illustrates an exploded view of the spill-resistant appliance according to FIG. 1.

Now turning to FIG. 2, a fully exploded view of the chassis 24 is shown. The box 25 is shown separated from the front portion 26; however, a second front portion 27 is still attached to the box 25 and can be seen extending from a side 28 of the box 25. The second front portion 27 is attached to the front portion 26 with the use of the second sealant 60 placed at various intervals along the second front portion 27. Preferably, strips of the second sealant 60 are placed at an angle oriented with a downward slope such that the portion of the second sealant 60 closer to the cavity 30 of the box 25 is in a higher position than the portion of the second sealant 60 on the opposing side of the cavity 30. Positioning the second sealant 60 with slope helps funnel any liquid that might fall between the front portion 26 and the second front portion 27 away from the box 25 and also away from the control housing 72. Preferably, the second sealant 60 is a foam adhesive tape with adhesive on both sides of the tape. One particular example of such a tape is very high bond, "VIM" tape commonly made by 3M. The second sealant 60 may be trimmed either manually with scissors or automatically with a press to form the desired shapes necessary for the application. The second sealant 60 helps prevent liquid penetration into the control housing 72 and may be used in any location where liquid may enter the control housing 72 or any other area where liquid is undesirable. The second sealant 60 also functions as an adhesive to hold together various components. The first sealant 56 is also shown above the box 25 and is in position for ceiling the seam of joint 57 between the control housing 72 and the box 25, as described in reference to FIG. 1. The first sealant 56 may also be used in any location where liquid may enter the control housing 72 or any other area where liquid is undesirable.

The control housing 72 is also shown separated from the side 28 of the box 25. Multiple fasteners 64 are shown that are used to attach the control housing 72 to the box 25 and also to the second front portion 27. Various components such as electronics 76 and sensor 78 are protected inside the control housing 72. Insulation 74 may also be used to shield the components inside the control housing 72 from heat that is generated inside the cavity 30 when the appliance 22 is in operation. Additional items such as wiring 70 may also be included inside the control housing 72. A power cord 68 supplies power to the various components inside the control housing 72 and is passed through a hole 77 on the control housing 72. A grommet 80 on the power cord 68 seals the hole 77 and prevents any liquid from entering the control housing 72 through the hole 77.

The knob 40, switch 48, and indicator light 46 are shown separated from the front portion 26 exposing their respective openings 32. In order to seal the opening 32 of the knob 40, a ring 42 is inserted into the opening 32 of the knob 40. While the ring 42 may be made out of any material, preferably a deformable material such as polyvinyl chloride is used to seal the opening 32. The knob 40 is shaped to surround the ring and act as a double barrier against liquid entering the respective opening 32. In order to seal the opening 32 of the indicator light 46 an O-ring 44 is inserted around the indicator light 46 on the part of the indicator light 46 that is passed through the front portion 26. A clip 45 is also inserted on the part of the indicator light 46 passed through the front portion 26 after the O-ring 44 is attached and helps press the O-ring 44 up against the front portion 26 and seal the respective opening 32 from liquid entry. To seal the opening 32 of the switch 48, a boot 50 (shown in FIG. 14) is used to surround the switch 48. Alternatively, the switch 48 may be waterproof without the use of boot 50.

Figure 3:
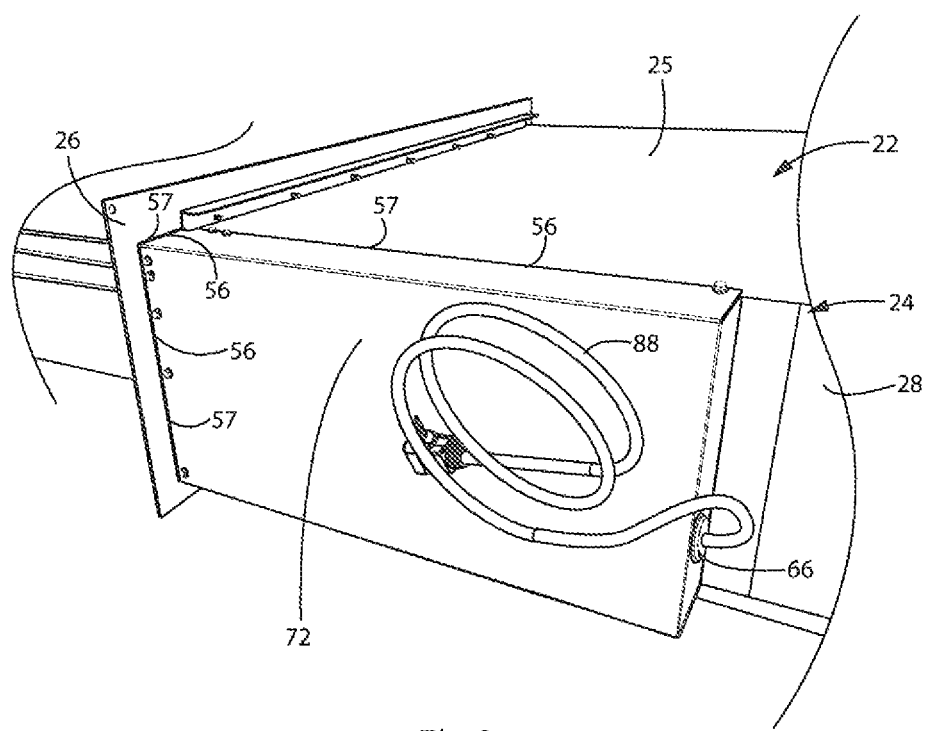
FIG. 3 illustrates a perspective side view of the spill-resistant appliance according to FIG. 1.

FIG. 3 shows the appliance 22 with the drawer 36 in the extended position. The control housing 72 is also shown attached to the box 25 of the chassis 24. As explained above, the first sealant 56 is placed along the joint 57 between the control housing 72 and the box 25. The first sealant 56 is also used in the joints 57 between the control housing 72 and the front portion 26. The power cord 68 is also shown extending from the control housing 72 and the grommet 66 can be seen preventing liquid from entering the hole 77. While the first sealant 56 is shown in the various joints 57, the second sealant 60 may also be used in any of these locations in addition to the first sealant 56, or as a replacement of the first sealant 56.

Figure 4:
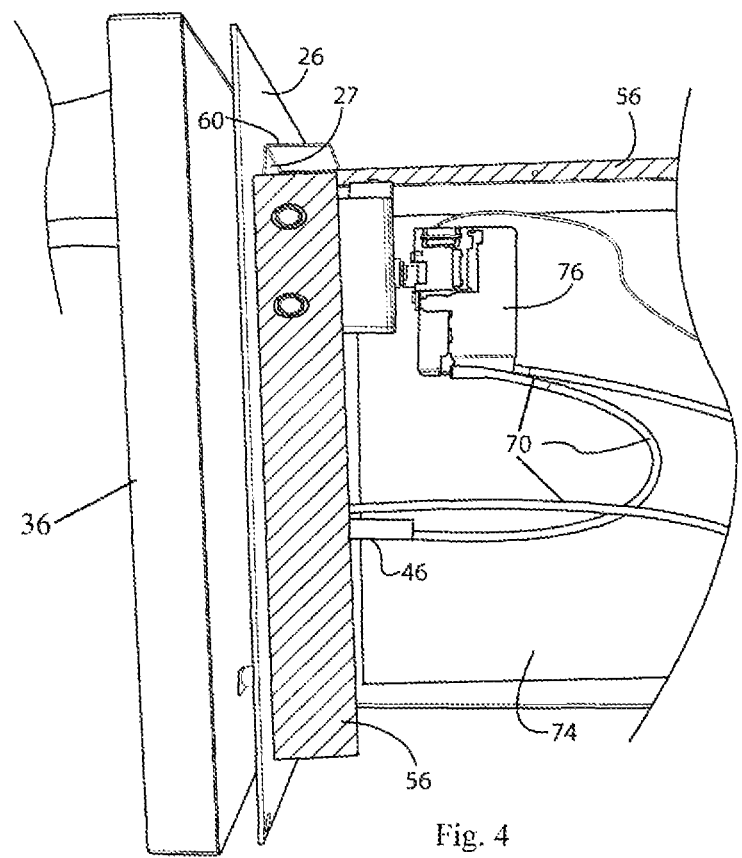
FIG. 4 illustrates a partial side view of the spill-resistant appliance according to FIG. 1.

Moving on to FIG. 4, the box 25 of the chassis 24 is shown with the control housing 72 removed. The front portion 26 is shown attached to the second front portion 27 with the second sealant 60 between them. The first sealant 56 is also shown applied to the side of the second front portion 27. The wiring 70, electronics 76, and the indicator light 46 are all shown extending from the front portion 26 and the second front portion 27. Insulation 74 may be seen against the box 25 to help insulate against heat generated when the appliance 22 is in operation. The control housing 72 covers all these elements with the use of the first sealant 56 and the second sealant 60 preventing liquids from contacting these devices.

Figure 5:
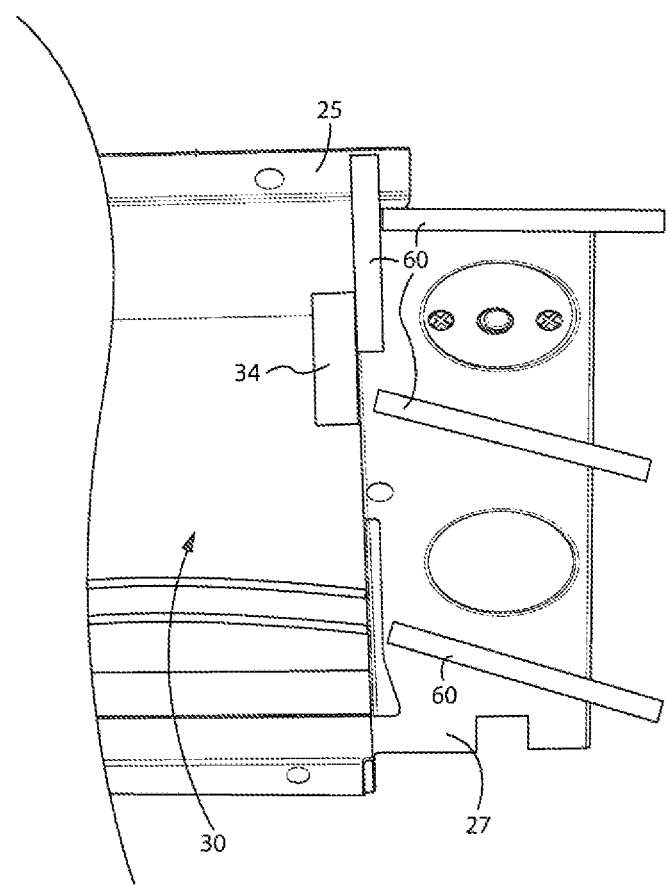
FIG. 5 illustrates a partial front view of the spill-resistant appliance according to FIG. 1.

Transitioning to FIG. 5, the second front portion 27 is shown attached to the box 25 of the chassis 24. As described with reference to FIG. 2, the second sealant 60 may be placed in various positions along the second front portion 27. The second sealant 60 works to help secure the second front portion 27 to the front portion 26 and to prevent liquid from entering the control housing 72 (not shown). The second sealant 60 may be placed on the second front portion 27 with a downwardly angle to deflects any liquid that may run along the face of the second front portion 27 away from the chassis 24.

Figure 6:
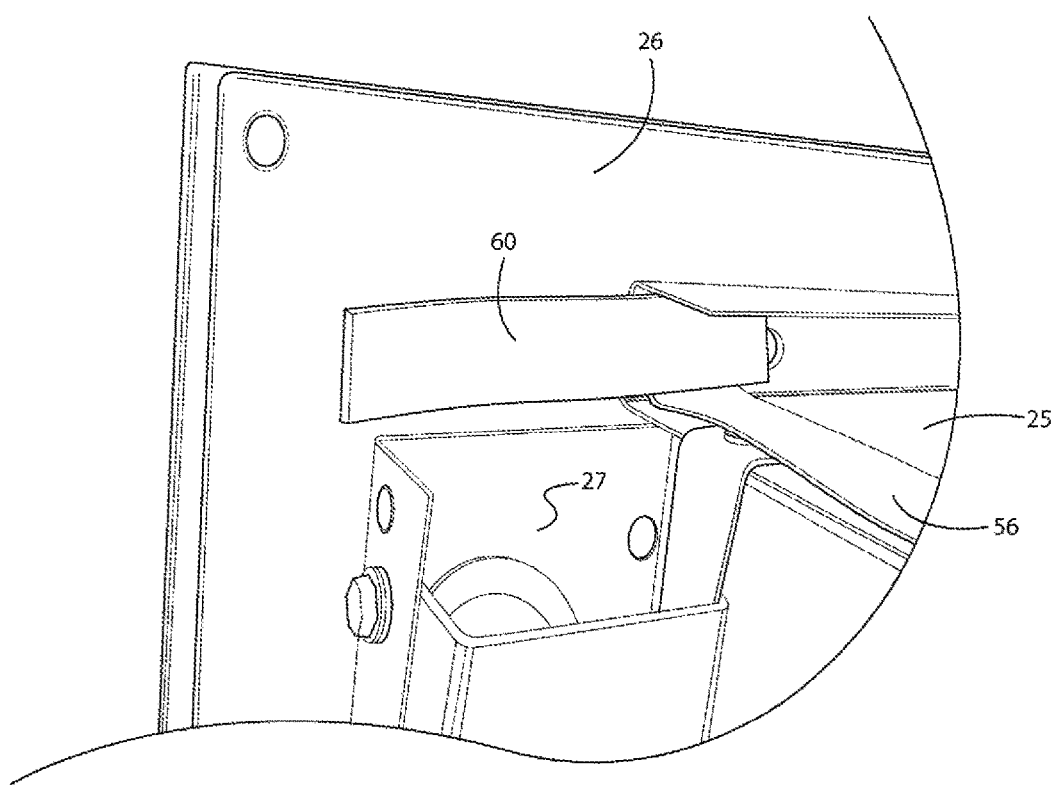
FIG. 6 illustrates a partial perspective view of the spill-resistant appliance according to FIG. 1.

FIG. 6 shows the rear side of the second front portion 27 while it is attached to the front portion 26. A strip of the second sealant 60 may be placed on the front portion 26 above the second from portion 27 to help prevent liquids from flowing between the front portion 26 and the second front portion 27. A strip of first sealant 56 is also shown along the top of the box 25 to prevent liquid from entering the control housing 72 once it is in place.

Figure 7:
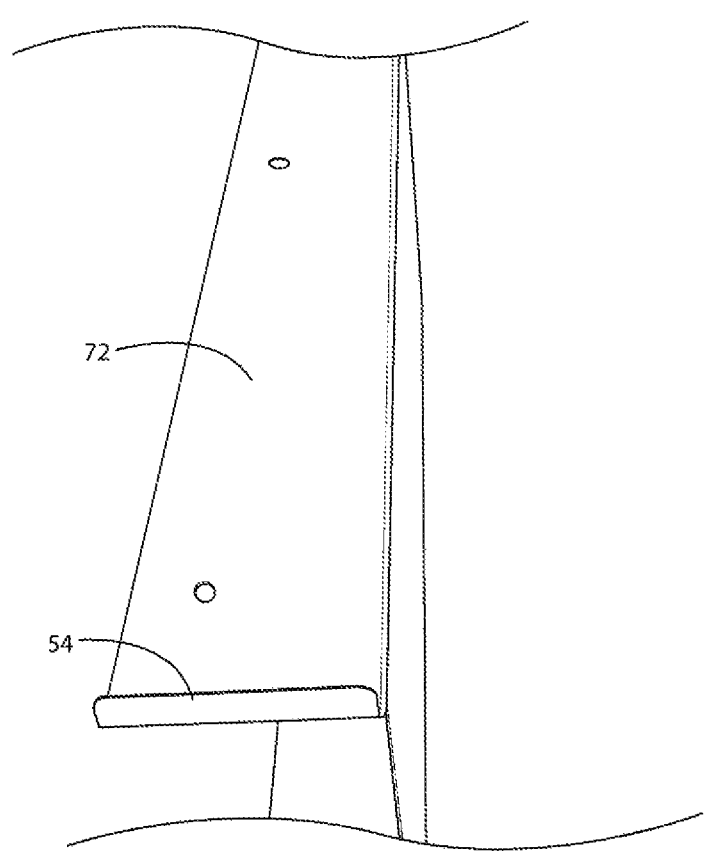
FIG. 7 illustrates a partial perspective view of the spill-resistant appliance according to FIG. 1.
Figure 8:
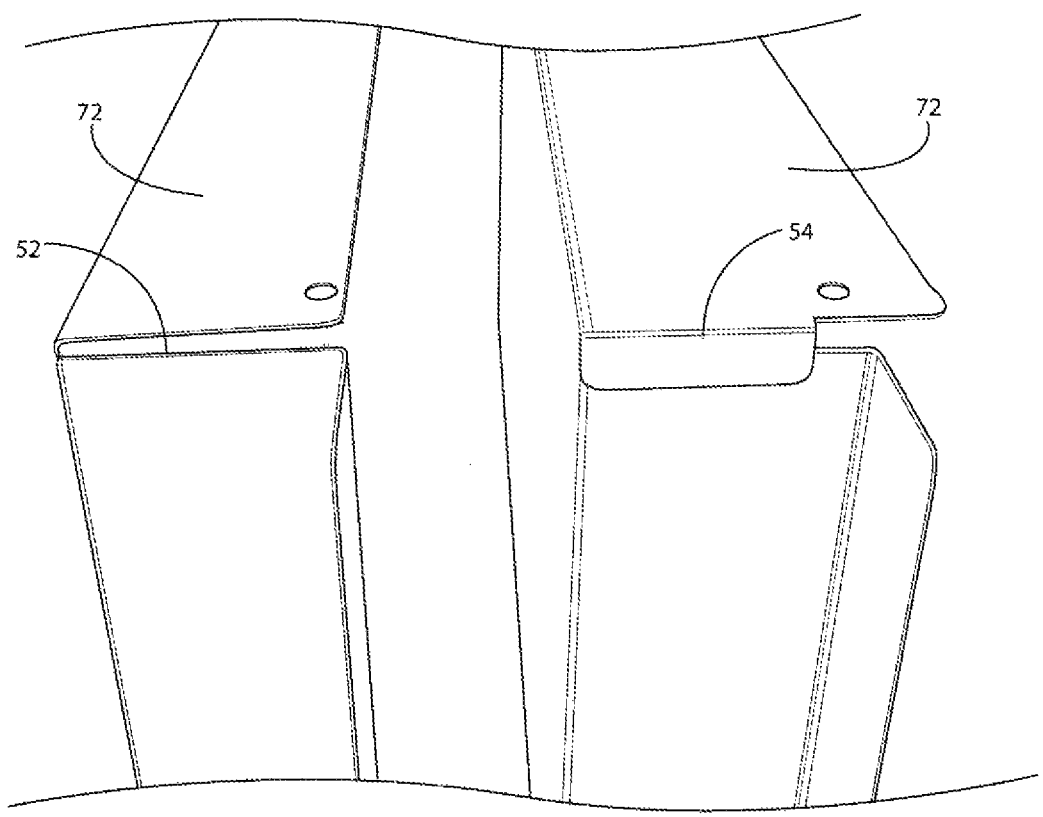
FIG. 8 illustrates a partial perspective view of the spill-resistant appliance according to FIG. 1.

The control housing 72 is shown in FIG. 7 detached from the box 25. A flange 54 forms a right angle along an edge of the control housing 72 and provides a wider area for sealing the control housing 22 against the front portion 26 (not shown). FIG. 8 also shows the control housing 72 with an open seam 52. Preferably, the seam 52 is closed with a flange 54 forming a right angle around the seam 52 and sealing the seam 52, thus preventing the entry of liquids. Any other means of sealing the seam 52 may also be used including, but not limited to, welding, adhesives, or forming a similar seam in another fashion. As long as the seam 52 is water tight, any sealing means may be used.

Figure 9:
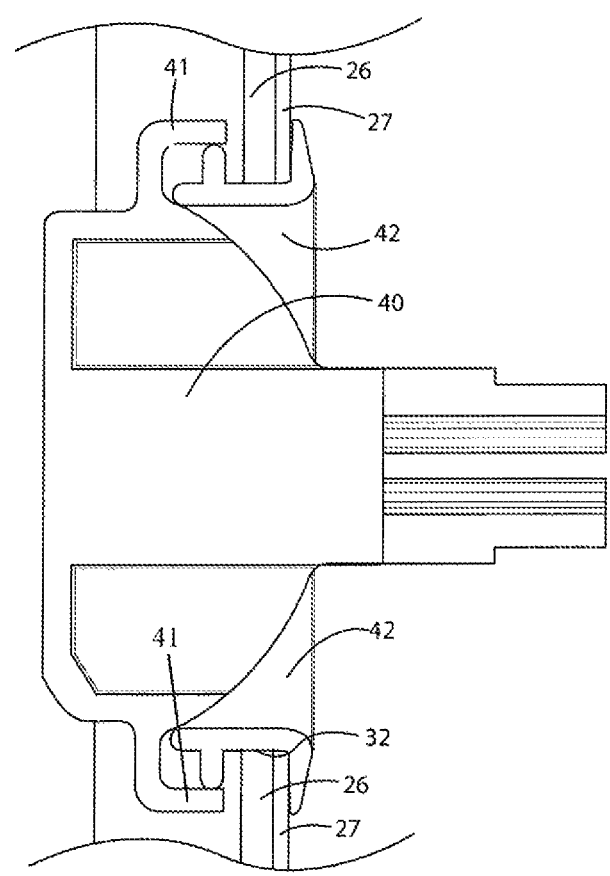
FIG. 9 illustrates a partial cross-sectional view of knob inserted in a front portion of the spill-resistant appliance according to FIG. 1.

FIG. 9 shows a cross-sectional view of the knob 40 inserted in an opening 32 of the front portion 26 and the second front portion 27. The ring 42 is shown sealing the opening 32 and preventing liquids from entering. The shape of the knob 40 includes a lip 41 that surrounds the ring 42 and offers added protection against the entry of liquids. Alternatively, the knob 40 may be attached to the ring 42 with either an adhesive or integrally molded as one piece, allowing the knob 40 and ring 42 to move in unison as the knob 40 is adjusted.

Figure 10:
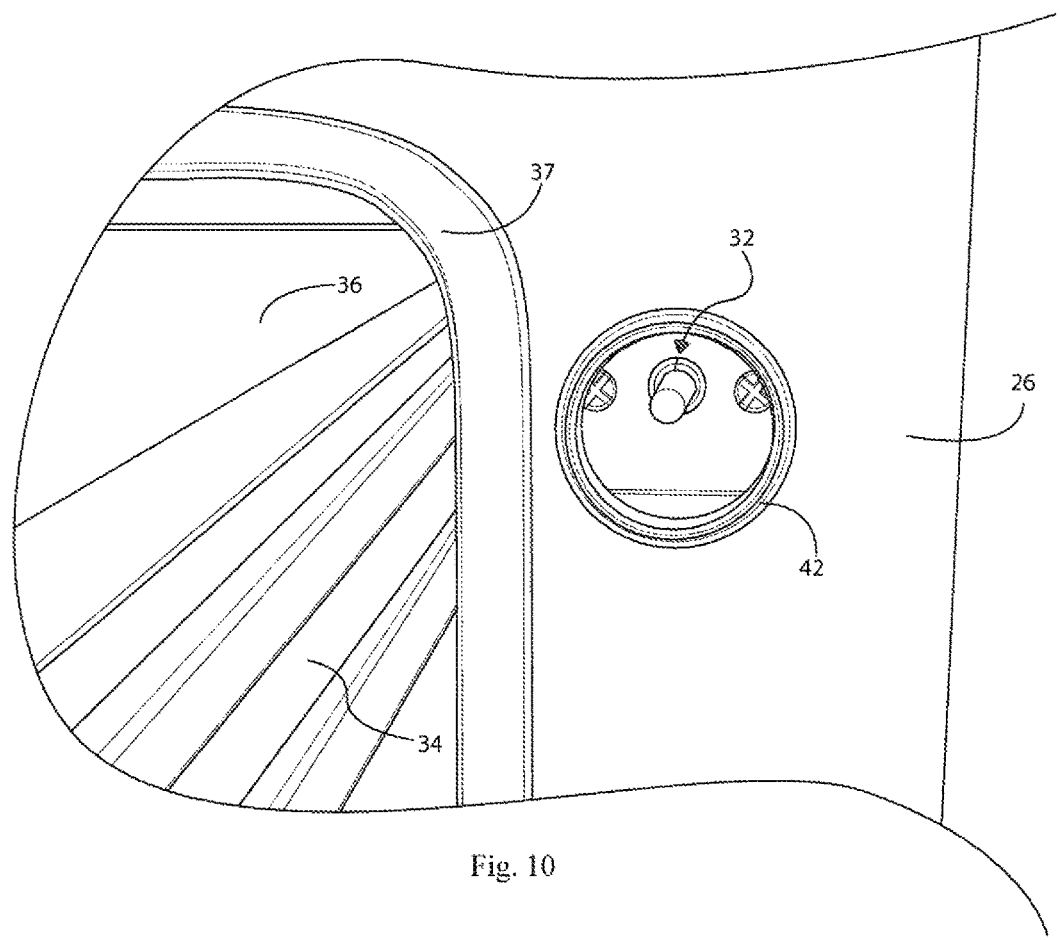
FIG. 10 illustrates a partial front view of the spill-resistant appliance according to FIG. 1.
Figure 11:
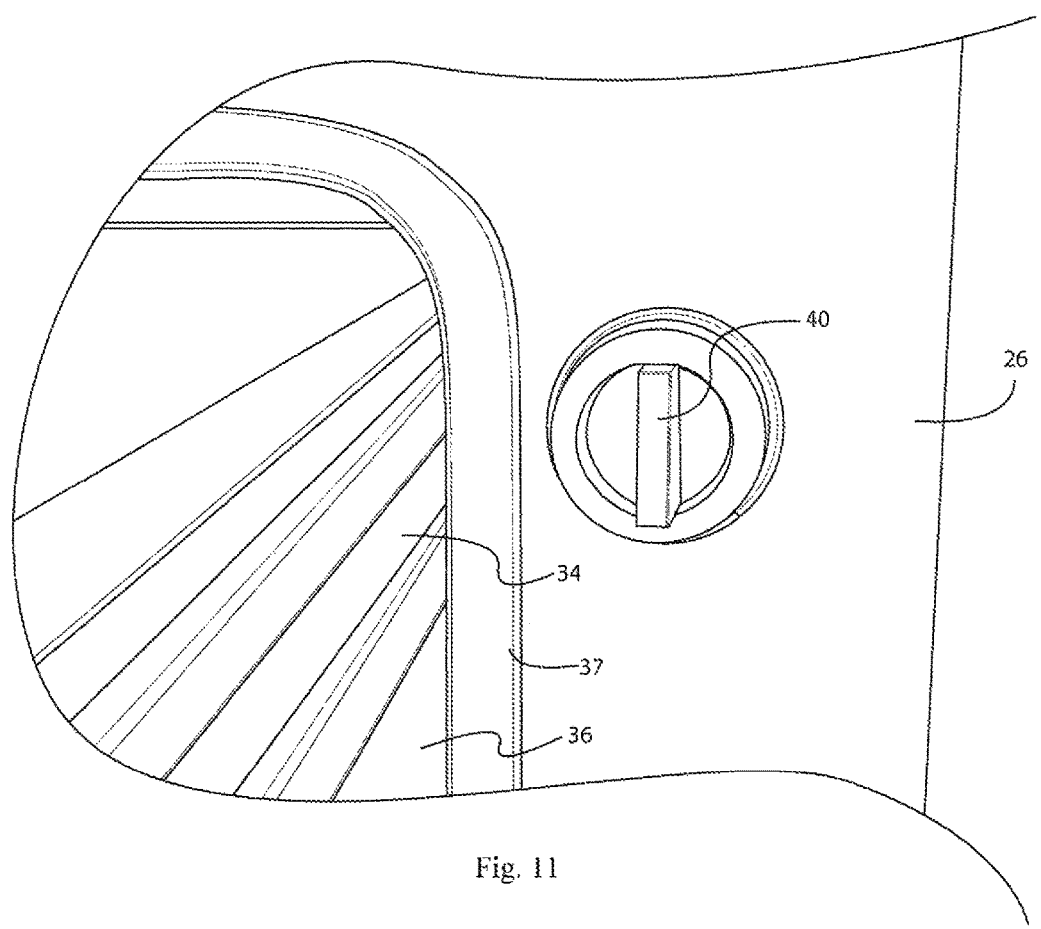
FIG. 11 illustrates a partial perspective view of the spill-resistant appliance according to FIG. 1.

Similarly, FIG. 10 shows the ring 42 inserted in the opening 32 for the knob 40 (removed in this view). As previously disclosed, the ring 42 is formed out of any material commonly used for forming grommets such as rubber or polyvinyl chloride. FIG. 11 shows the knob 40 inserted into the opening 32 and surrounding the ring 42 with a lip 41.

Figure 12:
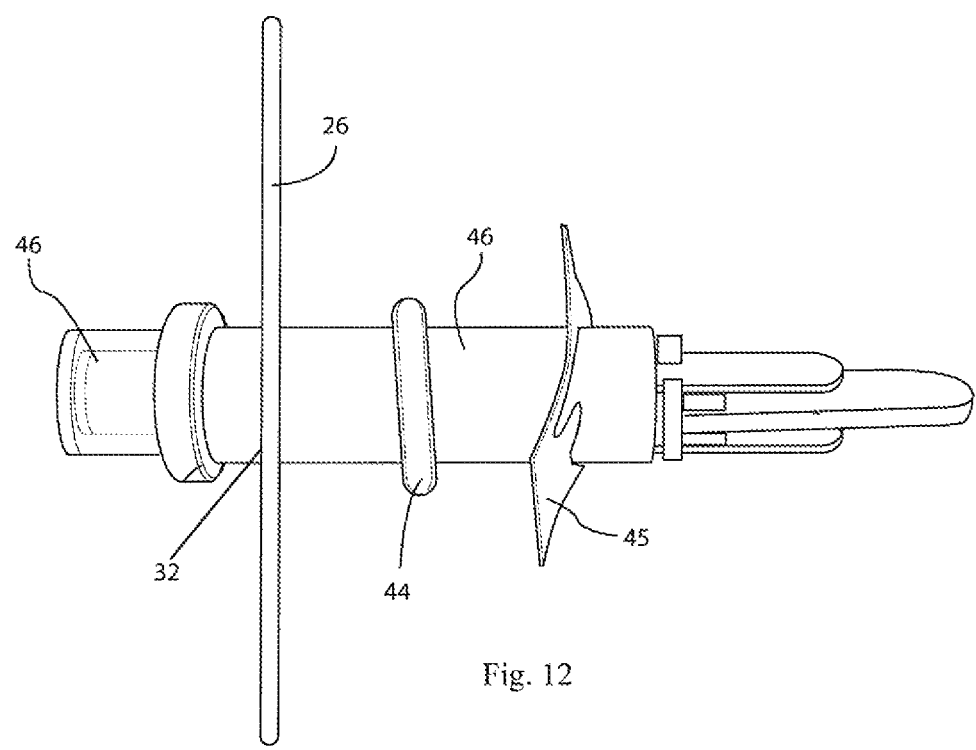
FIG. 12 illustrates a side view of an indicator light inserted in a simulated front portion of a partial front view of the spill-resistant appliance, partially assembled, according to FIG. 1.

Transitioning now to FIG. 12, the indicator light 46 is shown inserted into a simulated opening 32 in a front portion 26. The O-ring 44 is shown around a portion of the body of the indicator light 46 that is passed through the front portion 26. An additional O-ring 44 may also be included on the opposite side of the front portion 26 for added protection from liquids. A clip 45 is positioned on the indicator light 46 and may be pushed up against the front portion 26 to move the O-ring 44 against the front portion 26 and retain pressure against the O-ring 44. This effectively seals the opening 32 that the indicator light 46 is inserted into against any liquid entry.

Figure 13:
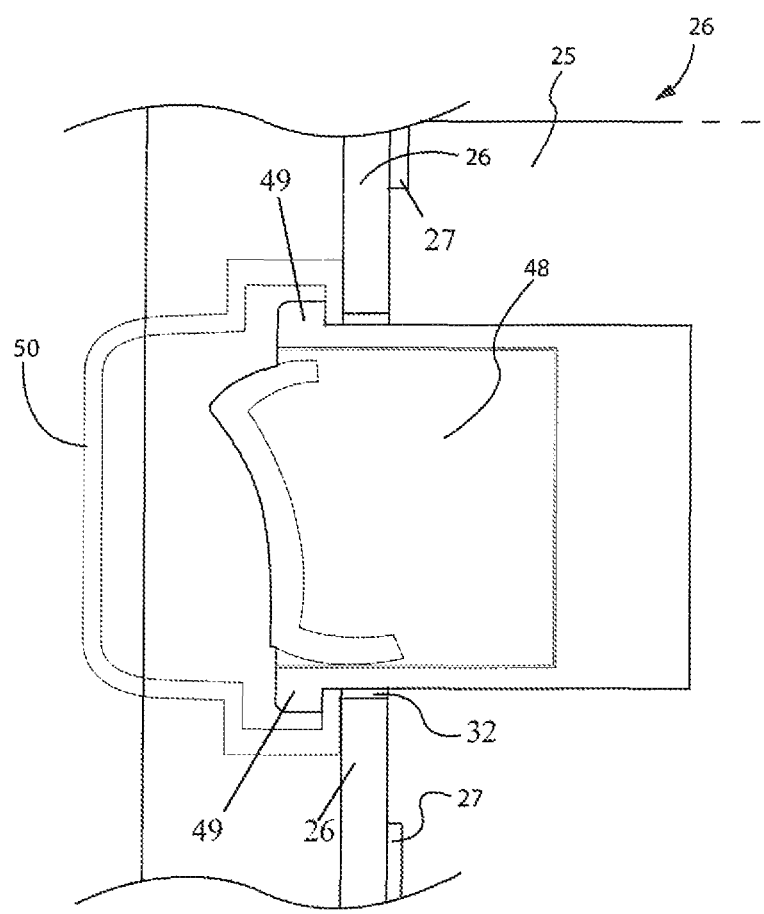
FIG. 13 illustrates a partial cross-sectional view of a switch inserted in a front portion of the spill-resistant appliance according to FIG. 1.

FIG. 13 shows a cross-sectional view of the switch 48 while it is inserted through an opening 32 in the front portion 26 and the second front portion 27. A boot 50 attaches under a lip 49 of the switch to deflect any liquids away from the opening 32 on the front portion 26. As described above, the boot 50 is formed out of any deformable serial such as rubber or polyvinyl chloride. The boot 50 is flexible and deformable to allow a user to operate the switch 48 while encapsulating the switch 48 from any liquids.

The individual components called out herein need not be fabricated from the disclosed materials, but could be fabricated from virtually any suitable materials. Moreover, the individual components need not be formed in the disclosed shapes, or assembled in the disclosed configuration, but could be provided in virtually any shape, and assembled in virtually any configuration. Further, although the components described herein are often described as physically separate modules, it will be manifest that they may be integrated into the apparatus with which it is associated. Finally, all the disclosed features of each disclosed embodiment can be combined with, or substituted for, the disclosed features of every other disclosed embodiment except where such features are mutually exclusive.

As can be seen, it is specifically intended that the present invention not be limited to the embodiments and illustrations contained herein, but includes modified forms of those embodiments including portions of the embodiments and combinations of elements of different embodiments as come within the scope of the following claims.

What is claimed is:

1. A spill-resistant appliance for warming or cooking comprising:
   a chassis forming a box with a front portion, the chassis including a plurality of openings, sides, and a cavity;
   an extendable member configured to extend from the cavity and retract into the cavity;
   a control housing with a plurality of controls within attached to the front portion and sides of the chassis with removable fasteners;
   a plurality of manual controls inserted into the plurality of openings on the front portion of the chassis and in communication with the plurality of controls;
   a first sealant included between the control housing and the front portion and sides of the chassis forming a liquid tight seal between the control housing and the chassis, wherein the first sealant is a gasket-like material; and
   a second sealant comprising a plurality of strips of material disposed on a front face of the box forming a liquid tight seal between the plurality of manual controls and the front portion of the chassis for preventing liquid from entering the control housing through the plurality of openings, each strip of material disposed adjacent a respective one of the openings and being spaced apart from an adjacent strip of material by one of the plurality of openings, wherein the second sealant extends from the front face of the box to the front portion of the chassis.

2. The spill-resistant appliance of claim 1, further comprising at least one control knob shaped to interlock with a ring in an opening of the chassis, the ring and the knob forming a liquid tight seal and preventing liquid from entering the opening.

3. The spill-resistant appliance of claim 2, wherein plurality of manual controls includes at least one indicator light, wherein an o-ring is secured against at least one of the plurality of controls and the front portion of the chassis, preventing liquid from entering the opening.

4. The spill-resistant appliance of claim 1, wherein the plurality of manual controls includes a switch with a flexible boot between the switch and the front portion of the chassis forming a liquid tight seal and preventing water from entering the respective opening.

5. The spill-resistant appliance of claim 1, wherein the gasket-like material of the first sealant includes a thermoplastic vulcanizate, such as SANTOPIUNE™, gasket.

6. The spill-resistant appliance of claim 1, wherein the plurality of strips of material of the second sealant includes an adhesive bonding tape and is configured to couple the front portion and the box.

7. The spill-resistant appliance of claim 1, wherein each strip of material of the second sealant is oriented at an inclined angle to deflect liquids away from the control housing.

8. The spill-resistant appliance of claim 1, wherein the control housing is shaped in a rectangular box with corners and seams on each corner, and wherein flanges shaped as right angles cover the respective seams and prevent liquid from entering the control housing.

9. A spill-resistant appliance for warming or cooking comprising:
   a chassis forming a box with a front portion, the chassis including a plurality of openings, sides, and a cavity;
   an extendable member configured to extend from the cavity and retract into the cavity;
   a control housing with a plurality of controls shaped in a rectangular box with corners and seams on each corner, with flanges shaped as right angles covering the respective seams and preventing liquid from entering the control housing;
   a plurality of manual controls inserted into the plurality of openings on the front portion of the chassis and in communication with the plurality of controls;
   a first sealant included between the control housing and the front portion and sides of the chassis forming a liquid tight seal between the control housing and the chassis;
   a second sealant comprising a plurality of strips disposed at various intervals on a front face of the box forming a liquid tight seal between the plurality of manual controls and the front portion of the chassis for preventing liquid from entering the control housing through the plurality of openings, each strip spaced apart from an adjacent strip by one of the openings on the front portion, wherein each strip of the second sealant is attached to the front face of the box at an angle to deflect liquid away from the box and the control housing, and wherein the second sealant is an adhesive bonding tape and couples together the front portion of the chassis and the box.

10. The spill-resistant appliance of claim 9, wherein the plurality of manual controls include at least one indicator light, and wherein an o-ring is secured against at least one of the plurality of controls and the front portion of the chassis, preventing liquid from entering the opening.

11. The spill-resistant appliance of claim 9, further including at least one control knob attached to a ring, sealing an opening on the front portion of the chassis from, entry of liquids, the ring and the knob configured to moved together relative to the front portion.

12. The spill-resistant appliance of claim 9, wherein the first sealant includes a thermoplastic vulcanizate gasket.

13. A spill-resistant appliance for warming or cooking comprising:
   a chassis including:

a box having a plurality of sides, a cavity, and a box front portion extending from a side of the box; and
a chassis front portion including a plurality of openings;
an extendable member configured to extend from the cavity and retract into the cavity;
a control housing with. a plurality of controls within attached to the chassis with removable fasteners;
a plurality of manual controls inserted into the plurality of openings on the chassis front portion and in communication with the plurality of controls;
a first sealant included between the control housing and the box of the chassis forming a liquid tight seal between the control housing and the chassis, wherein the first sealant includes a thermoplastic yulcanizate; and
a second sealant comprising a plurality of strips of material disposed on of the box front portion forming a liquid tight seal between the plurality of manual controls and the chassis front portion for preventing liquid from entering the control housing through the plurality of openings of the chassis front portion and the plurality of openings of the box front portion, wherein each strip of material is disposed adjacent a respective one of the openings on the box front portion and is spaced apart from an adjacent strip of material by one of the plurality of openings on the box front portion, wherein each strip of the second sealant is attached to the front face of the box at an angle to deflect liquid away from the box and the control housing, and wherein each strip of material includes an adhesive bonding tape configured to couple the chassis front portion and the box.

14. The spill-resistant appliance of claim 13, further comprising at least one control knob shaped to interlock with a ring in an opening of the chassis front portion to form a liquid tight seal and prevent liquid from entering the respective opening.

15. The spill-resistant appliance of claim 13, further comprising an o-ring secured against at least one of the plurality of manual controls and a respective at least one opening of the chassis front portion to form a liquid tight seal and prevent liquid from entering the respective at least one opening.

16. The spill-resistant appliance of claim 13, wherein the control housing is shaped in a rectangular box with corners and seams on each corner, and wherein flanges shaped as right angles cover the respective seams and prevent liquid from entering the control housing.

\* \* \* \* \*